Figure 11:
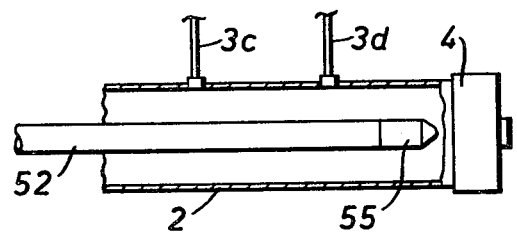
Figure 12:
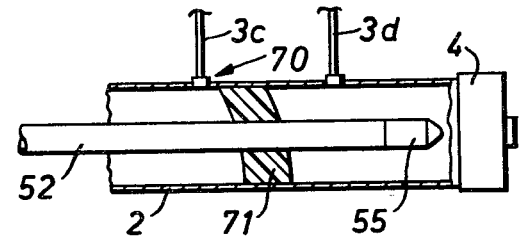

United States Patent [19]

Soper et al.

[11] 4,437,494

[45] Mar. 20, 1984

[54] MAINS INSERTION

[75] Inventors: Douglas C. Soper, Dorchester; Brian Gould, Hoddlesdon, Darwen, both of England

[73] Assignee: British Gas Corporation, London, England

[21] Appl. No.: 390,080

[22] Filed: Jun. 18, 1982
(Under 37 CFR 1.47)

[30] Foreign Application Priority Data

Jun. 19, 1981 [GB] United Kingdom ................. 8118965

[51] Int. Cl.³ ............................................. F16L 55/18
[52] U.S. Cl. ...................................... 138/97; 137/315
[58] Field of Search ........................... 138/97, 89, 114; 137/315, 317, 318, 237, 238

[56] References Cited

U.S. PATENT DOCUMENTS

| | | | |
|---|---|---|---|
| 3,688,801 | 9/1972 | Rohrer | 138/97 |
| 3,845,789 | 11/1974 | Rohrer | 138/97 |
| 4,009,732 | 3/1977 | Martin et al. | 138/97 |
| 4,090,534 | 5/1978 | Martin et al. | 138/97 |
| 4,252,152 | 2/1981 | Martin et al. | 138/97 |
| 4,253,497 | 3/1981 | Martin et al. | 138/97 |
| 4,327,760 | 5/1982 | Lancaster | 137/317 X |

Primary Examiner—John W. Shepperd
Attorney, Agent, or Firm—Lalos, Leeds, Keegan, Lett & Marsh

[57] ABSTRACT

In a method of replacing a section of an old cast iron main with a new main of plastics pipe material, the section to be replaced is isolated from the adjacent live main after a by-pass is fitted between the section and the main. One end of the pipe is then pushed up the isolated section until a desired length is located within the isolated section and the other end of the pipe is connected to the end of the adjacent main. This enables the isolated section to be kept alive solely by gas flow through the pipe from the main and the by-pass can therefore be removed.

9 Claims, 19 Drawing Figures

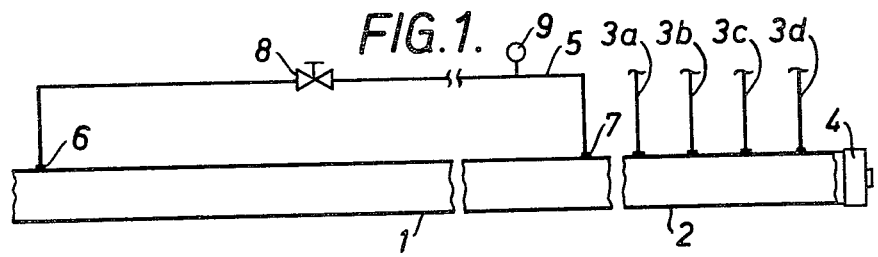
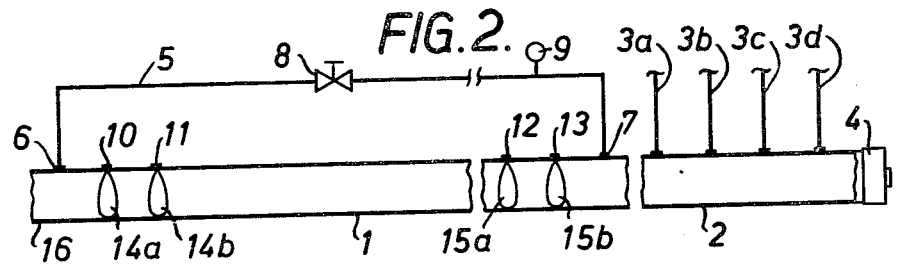
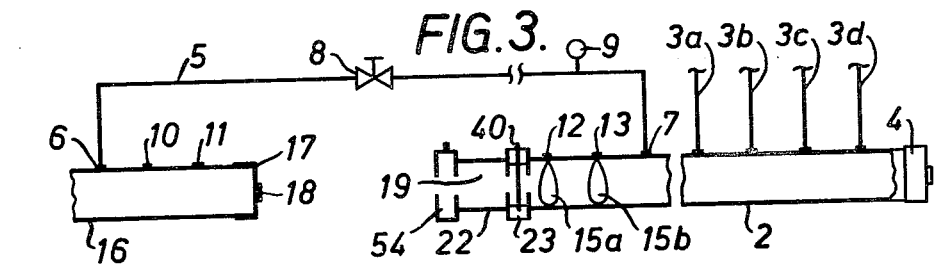
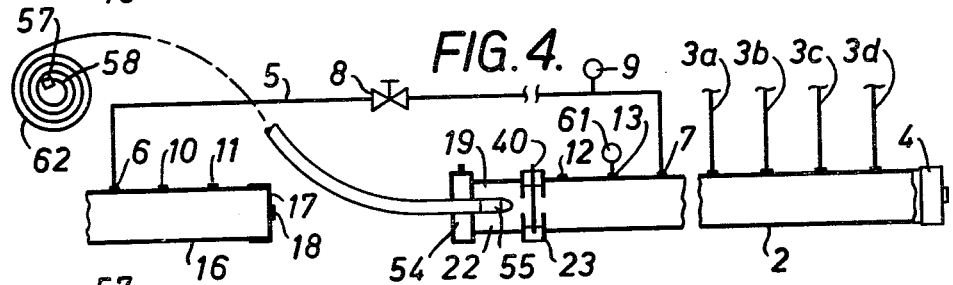
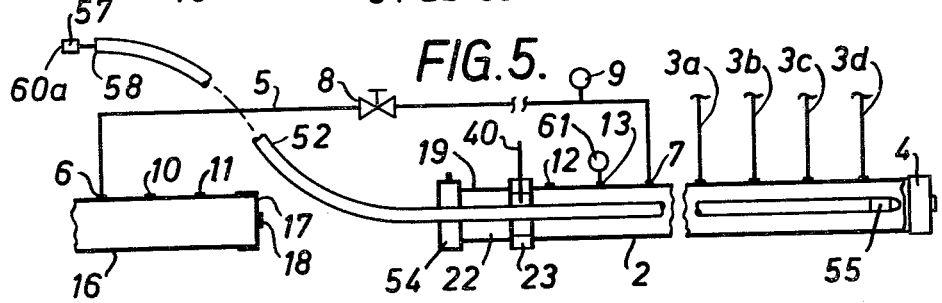

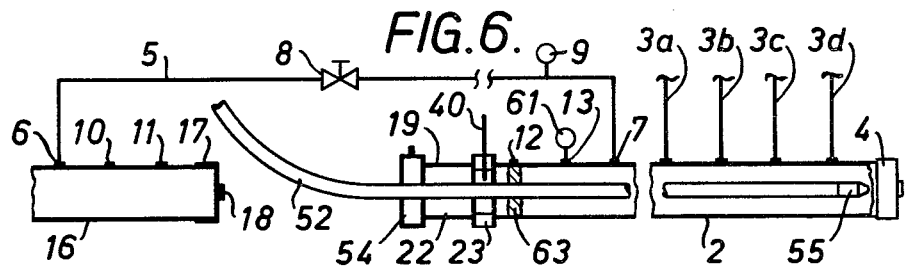
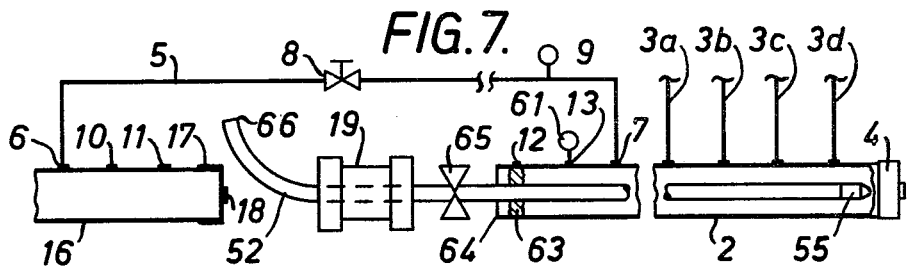
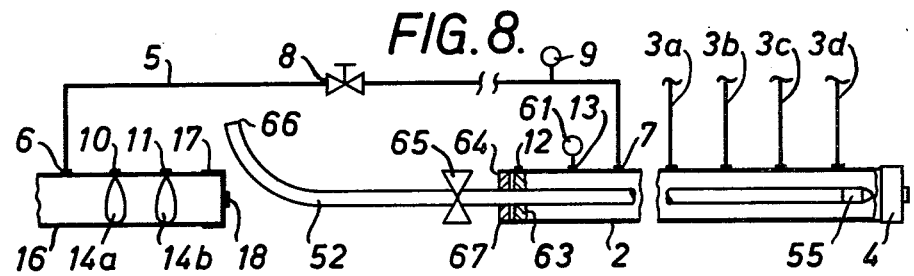
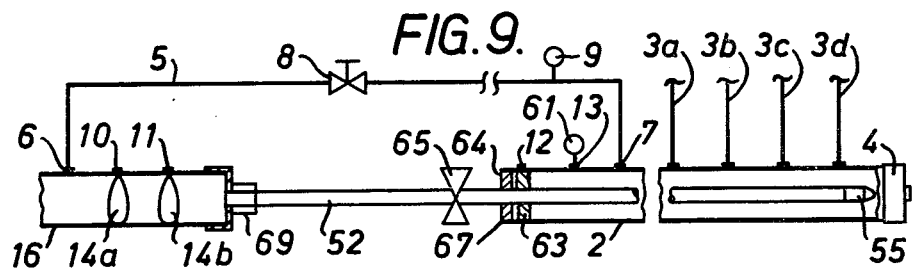
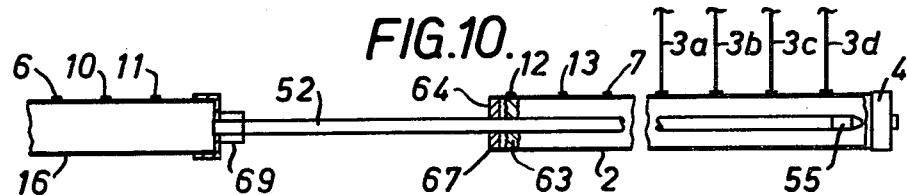

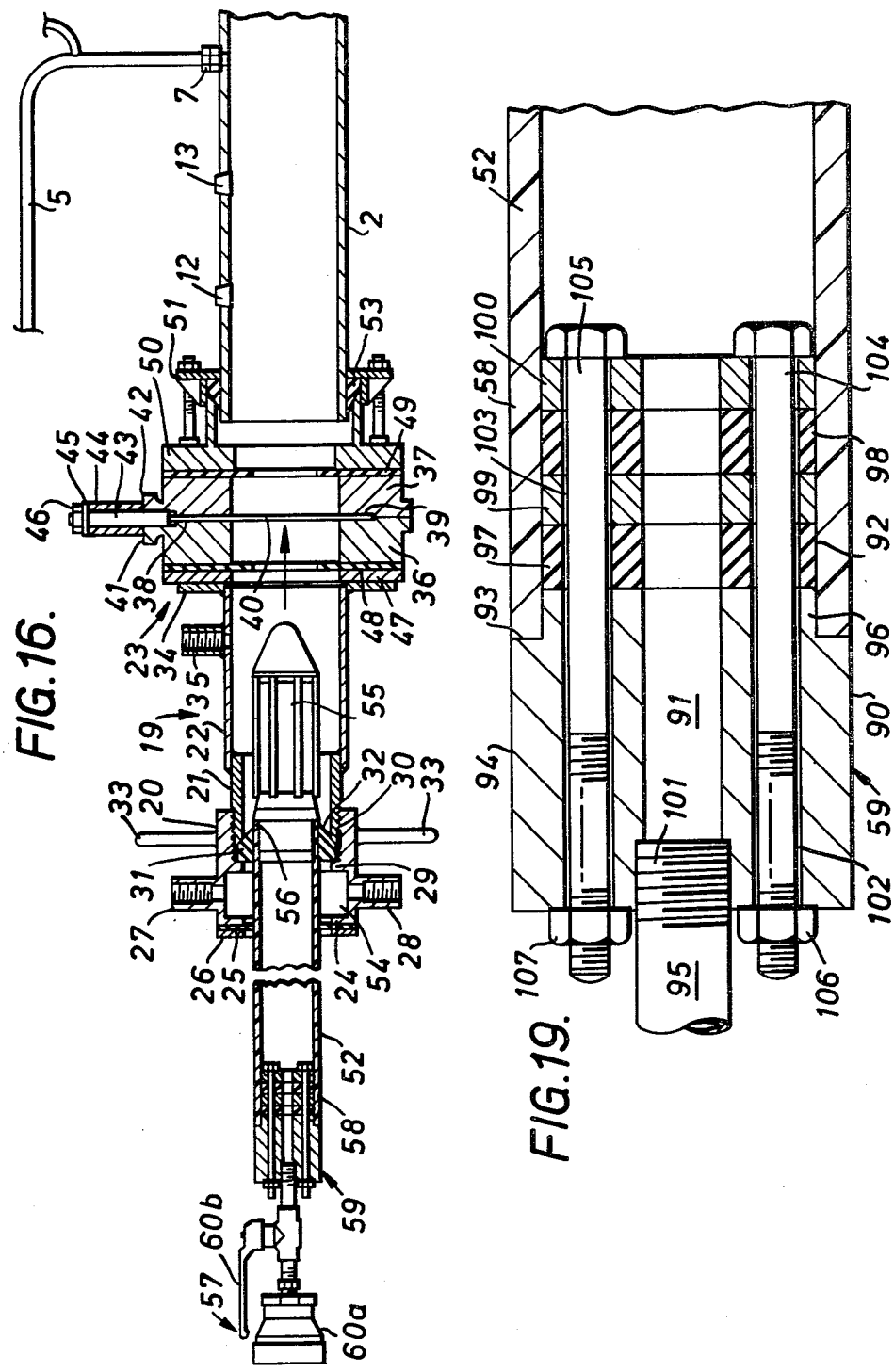

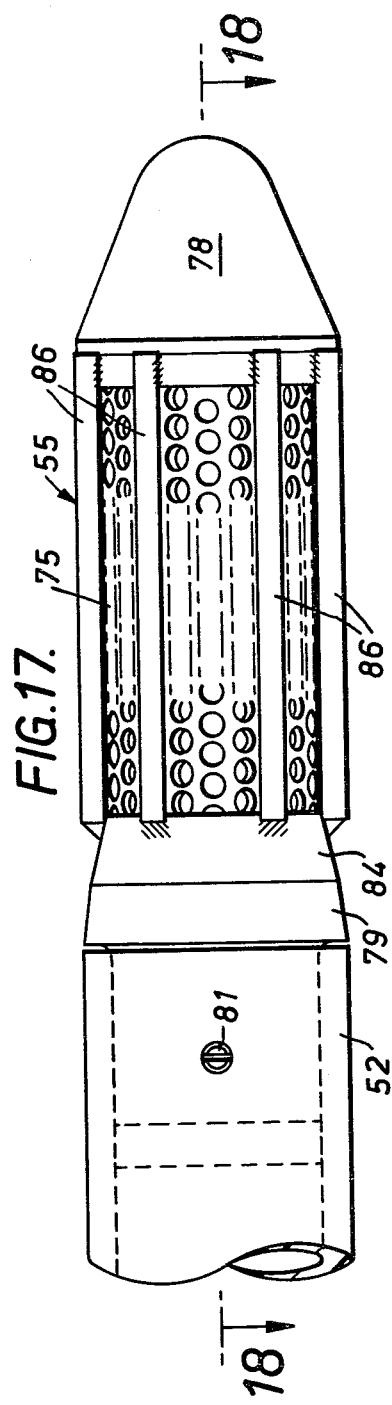
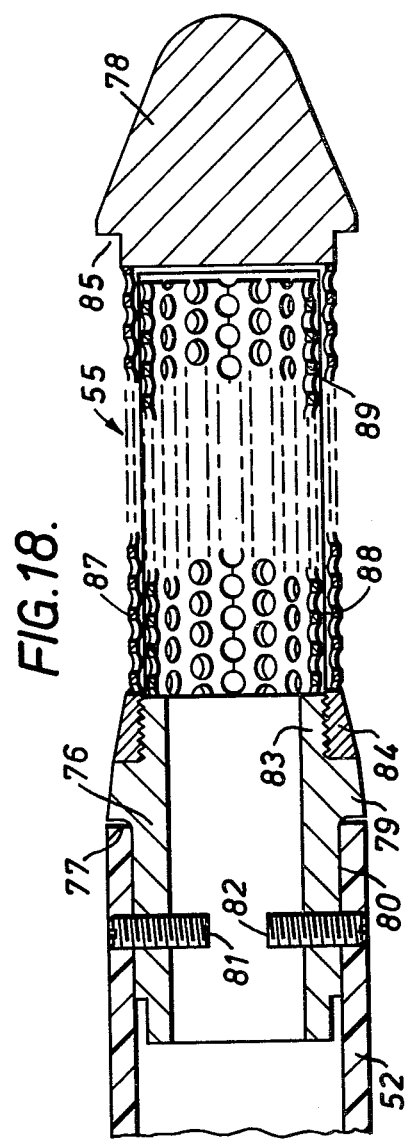

MAINS INSERTION

The present invention relates to a technique known as "live insertion" whereby an existing main carrying a fluid, particularly gas, is replaced by a replacement main of smaller diameter than the existing main while the existing main is still live.

As a consequence service lines connected to the existing main can still be supplied with gas so that minimum disruption is caused to gas users during the replacement process.

Existing cast iron gas mains laid many years ago have become corroded and damaged over the years and as a result frequently develop leaks which can be highly dangerous. While it is still the practice to repair such leaks wherever possible, increasingly the old cast iron mains are being replaced by plastics mains such as, for example, polyethylene pipe as a safety precaution. Usually this replacement involves inserting the replacement pipe into the old main necessitating, of course, that the new pipe is of smaller external diameter than the internal diameter of the old main. After insertion, the service lines connected to the old section of main are disconnected therefrom, the old main is broken out to expose the inner new main and the service lines are reconnected to the new main.

In so called "dead insertion", the section of the old main to be replaced is isolated from the remainder of the old main but is not kept live in any way. Consequently service lines connected to the section are also dead and users of these services suffer the inconvenience of being cut off from the gas supply until the new main has been inserted into the isolated section and connected to the remainder of the old main so that the new main is live and the service lines reconnected to the replacement main. In order to reduce the inconvenience to the users, the period during which they are cut off is reduced to a minimum but this means that only small sections can be renewed at any one time. Furthermore, replacement, disconnection and reconnection must all take place on the same day if the inconvenience to the users is to be minimised even though the weather conditions might have deteriorated to an alarming extent since the start of the replacement program.

With the technique known as "live insertion" the inconvenience to gas users is reduced because in this case the old main is kept live during and after the insertion of the replacement main by gas flow in the space between the outer wall of the replacement main and the inner wall of the old main.

U.S. Pat. Nos. 3,845,789 and 4,090,534 both disclose similar forms of a technique for "live insertion". In these techniques, the ground at either end of the section of the old main to be replaced is excavated to expose the old main. The section of the old main is then isolated from the remainder of the main but is kept live by fitting a bypass between a live section of the remaining main and the isolated section. The bypass therefore maintains the isolated section live during replacement. Two insertion ducts are fitted at either end of the isolated section and the replacement main is inserted through the insertion duct at one end of the isolated section and out through the insertion duct at the other end of the isolated section.

In U.S. Pat. No. 3,845,789 the leading end of the replacement main is connected to a main after it has emerged from the duct while the other end which is located outside the isolated section is sealed. In U.S. Pat. No. 4,090,534 on the other hand, the leading end of the replacement main is sealed by a bull nose connected to a winching cable before the replacement main is inserted into the first duct. After the replacement main has been winched through the isolated section, its other end which lies outside the first insertion duct is also sealed. The bull nose is removed from the leading end which is then connected to a main. In both these techniques after the leading ends have been connected to the high pressure main the excavation at the leading end of the inserted main can be filled in.

While the live insertion techniques described are markedly superior to dead insertion because the isolated section is maintained live, they suffer from the disadvantage that until all the service lines are connected up to the replacement main, the bypass connection between the isolated section of the old main and the remainder of the old main must be maintained in order to maintain the isolated section live. Consequently the excavation at the bypass end of the isolated section cannot be filled in until the bypass is removed. Since this excavation may be of the order of 20 feet in length and 3 or 4 feet in width and depth, considerable inconvenience is likely to be caused to pedestrians and traffic which may have to circumvent this excavation. In addition, if the excavation is to be left overnight it will be necessary to provide hazard warning lamps and the like at the excavation thus adding to the cost of the replacement. If the excavation is located immediately outside dwellings in a residential street, there may be considerable inconvenience to the inhabitants of those dwellings. Furthermore further inconvenience will be caused because of the presence admittedly for a relatively short time of the other excavation at that end of the isolated section opposite the by-pass end.

Thus in order to minimise such inconvenience it is the practice to attempt to remove the by-pass and fill in the excavations as soon as possible and preferably on the same day as the replacement is made. If this is to be done however, the length of the section of main to be replaced must of necessity be limited in order to be able to limit the number of service lines to be reconnected to the replacement main to a number achievable in a normal work day.

It is therefore one object of the present invention to provide a method for maintaining live a section of an existing main isolated from the rest of the main and within which a replacement main is located without the use of a by-pass between the isolated section and the rest of the main.

It is also an object of the present invention to provide a method for replacing a section of an existing main with a replacement main where only one excavation at one end of the section, rather than two excavations at either end of the section, needs to be made.

It is another object of the present invention to provide a duct for connection to one end of the section to be replaced to act as a temporary seal at that end during replacement by the replacement main.

It is yet another object of the present invention to provide a head for insertion into an isolated section of an existing main so as to enable fluid either to flow into or out of a replacement main which is to replace the isolated section.

It is a further object of the present invention to provide an assembly for insertion into an isolated section of an existing main.

It is a still further object of the present invention to provide a device for connecting a flexible pipe, for instance to act as a replacement main, to the inlet end of a purge valve.

According therefore to one aspect of the present invention, there is provided a method for maintaining live a section of an existing main isolated from the rest of the main until service lines connected to the isolated section are disconnected therefrom and reconnected to the replacement main of smaller diameter than the existing main and located within the isolated section, the method comprising allowing fluid to flow between a live part of the rest of the existing main and the isolated section solely by way of the replacement main.

Preferably the replacement main has an opening located in the isolated section.

Suitably the opening is located beyond the service line most distant from the live part of the rest of the existing main.

Conveniently the replacement main is connected to that part of the rest of the main adjoining that end of the isolated section into which the replacement main is inserted.

According to another aspect of the present invention, there is provided a method for replacing a section of an existing main with a replacement main of smaller diameter than the existing main, the method comprising isolating the section of the existing main from the adjacent existing main after ensuring that the isolated section is supplied with fluid independently of its previous junction with the existing main, pushing one end of the replacement main into the isolated section until a desired length of replacement main is located within the isolated section and connecting the other end of the replacement main to the existing main.

Preferably fluid is allowed to enter the length before it is pushed up the isolated section and to discharge from the length after the replacement main is connected to the existing main.

Suitably fluid is allowed to enter and flow out of the replacement main for a period before the replacement main is pushed into the isolated section so as to purge the replacement main of any air.

Conveniently at the end of the period, the flow of fluid out of the replacement main is obstructed at some point outside the isolated section.

Preferably before the replacement main is connected to the existing main, the flow of fluid along the replacement main is further temporarily obstructed at some point upstream of the obstruction but outside the isolated section, the other obstruction is removed and the replacement main is connected to the adjacent existing main and the temporary obstruction is removed.

Suitably fluid enters and discharges from the end of the length.

Conveniently fluid is allowed to enter the length before it enters the isolated section.

In a preferred embodiment of the invention, the replacement main is caused to enter an entry end of the isolated section by way of a temporary seal connected to the entry end of the isolated section, the temporary seal being subsequently removed therefrom and from the replacement main before the replacement main is connected to the adjacent existing main.

Essentially, before the temporary seal is removed, the space between the external wall of the length of replacement main and the internal wall of the isolated section is sealed at a point close to the entry end of the isolated section.

Conveniently after the temporary seal is removed the space between the external wall of the length of replacement main and the internal wall of the isolated section is sealed at the entry end of the isolated section.

Preferably the end of the length is located beyond that service line connected to the isolated section and most distant from the entry end of the isolated section.

Suitably, the end is sealed after all but those two service lines most distant from the entry end of the isolated section are disconnected from the isolated section and reconnected to the replacement main.

According to yet another aspect of the present invention, there is provided a duct for connection to an end of an isolated section of an existing main so as to enable a smaller diameter replacement main to be inserted thereinto to replace the isolated section, the duct having a wall defining an internal axial bore for the passage therethrough of the replacement main and a resilient annular seal having an internal periphery for engaging with the external wall of the replacement main, the seal being located within the bore in such a way that the seal forms a barrier to fluid flow within the annular space between the external wall of the replacement main and the internal wall of the duct when the replacement main is engaged by the internal periphery of the seal, the duct having at least one aperture extending through its wall into the bore for the injection into the bore of a lubricant to lubricate the external wall of the replacement main before engaging the seal.

Preferably another resilient annular seal is located within the bore of the duct and is so spaced axially from the other seal that the aperture communicates with the bore at a point located between the seals, the other seal having an internal periphery for engaging with the external wall of the replacement main.

In one embodiment of the present invention, the duct includes a valve for location nearer to the entry end of the isolated section than the seal forming the barrier to fluid flow, the valve being operable to open and close the duct.

The valve may comprise a movable gate.

Preferably the duct includes two detachably screw fitted portions, one of which houses the seal forming the barrier to fluid flow.

Suitably, the other portion forms a chamber between the seal and the valve for the insertion therein of the end of the replacement main.

Conveniently, the seal is forcibly retained between the portions.

Preferably, the seal is retained between a radial flange projecting inwardly from the internal wall of the portion housing the seal and the screw threaded end of the other portion.

According to yet another aspect of the present invention, there is provided a head for insertion into an isolated section of an existing main so as to enable fluid either to flow into or out of a replacement main which is to replace the isolated section, the head having one end for connection to one end of the replacement main which is to be inserted into the isolated section, an apertured nozzle communicating with a bore in the end of the head to permit fluid to flow into and out of the head and means for preventing the nozzle contacting the internal surface of the isolated section as the head moves therealong during insertion.

Preferably the means comprises bars extending axially of the nozzle and adapted to maintain the nozzle spaced apart from the internal surface of the isolated section as the head moves therealong.

In a preferred embodiment of the present invention, the nozzle comprises three concentric perforated cylinders in which the perforations in the middle cylinder are smaller than those in the outer and inner cylinder cylinders.

The perforations in the outer and inner cylinders may be substantially the same size.

Suitably the middle cylinder is a gauze.

Preferably the head has a curved nose at the other end to enable the head to traverse obstructions.

According to a further aspect of the present invention, there is provided an assembly for insertion into an isolated section of an existing main, the assembly comprising a replacement main of smaller diameter than the isolated section for replacement of the isolated section and a head attached to the end of the replacement main, the head having an apertured nozzle communicating with a bore in the end of the head to permit fluid to flow into and out the head, the nozzle having a number of apertures whose total area is at least equal to the area of the internal bore of the replacement main.

Preferably the total area of the apertures is at least three times that of the internal bore of the replacement main.

Suitably, the total area of the apertures is four times that of the internal bore of the replacement main.

In a preferred embodiment of the present invention, the head includes means for preventing the nozzle contacting the internal surface of the isolated section as the head moves therealong during insertion.

Suitably the means comprises bars extending axially of the nozzle to maintain the nozzle spaced apart from the internal surface of the isolated section as the head moves therealong.

Conveniently the nozzle comprises at least one perforated cylinder.

Preferably the nozzle comprises three concentric perforated cylinders in which the perforations in the middle cylinder are smaller than those in the outer and inner cylinders.

Suitably the perforations in the outer and inner cylinders are substantially the same size.

Conveniently the middle cylinder is a gauze.

Desirably the head has a curved nose at the other end to enable the head to traverse obstructions.

The replacement may be a flexible pipe.

Preferably the pipe is of plastics.

According to yet a further aspect of the present invention, there is provided a device for connecting a flexible pipe to the inlet end of a purge valve, the device comprising a cylindrical body having a central axial bore for the passage of fluid from the pipe to the valve, a first portion adapted to be fitted into the end of the pipe and a second portion having means for connecting its bore to the inlet end of the purge valve, the first portion having a resiliently deformable section inwardly of a rigid end section and the second portion being rigid and means for urging the portions together to cause the resiliently deformable section to expand radially outwardly to form a seal with the internal wall of the pipe.

Preferably the deformable section of the first portion comprises two resiliently deformable annular members separated by a rigid annular member.

Suitably the means for urging the portions together comprises two bolts extending axially through the body by way of two axially extending bores therein and located diametrically opposed on opposite sides of the central axial bore, the bolts being at least partly threaded inwardly from their ends for connection to correspondingly threaded nuts.

Conveniently the second portion has its bore at least partly threaded inwardly from one end for connection to a corresponding externally threaded portion on the purge valve inlet.

In one embodiment of the present invention, the second portion has a greater diameter than the first portion.

Preferably the first portion is joined to the second portion by way of a rigid annular section.

Embodiments of the invention will now be particularly described with reference to the accompanying drawings in which:

FIGS. 1 to 10 are schematic diagrams of a section of an existing gas main showing a sequence of stages in its replacement by a replacement main, FIGS. 11 to 15 are schematic diagrams of the far end of an isolated section of an existing gas main showing a sequence of stages in the connection of the two most distant service lines to the replacement main, FIG. 16 is a side view of a replacement main assembly before insertion into the isolated section of the main but after insertion into the purge chamber of an insertion duct, the figure showing an external side view of an insertion head and a purge valve and a sectional side view of the insertion duct and a device for connecting the replacement main to the purge valve, FIG. 17 is an external side view of an insertion head fitted to a replacement main, FIG. 18 is a sectional side view of the head in the direction of the lines shown in FIG. 17.

FIG. 19 is a sectional side view of a device for connecting the replacement main to the inlet end of a purge valve.

Referring to the initial stage of the replacement procedure, an excavation is first made to expose an existing live low pressure cast iron gas main 1, a section 2 of which is to be isolated and replaced by a relatively smaller diameter replacement main. In the Figures, the section 2 to be isolated is a so-called "dead-end" main which is connected to a number of customer service lines 3 (four of which are illustrated in the Figures) and which has a far end capped off by a conventional cap 4.

Referring to FIG. 1, a temporary by-pass 5 is connected between two spaced drilled aperture 6 and 7 in the part of the main exposed by the excavation. The by-pass 5 is provided with the usual manually operable shut off valve 8 and pressure gauge 9.

Referring to FIG. 2, four further apertures 10, 11, 12 and 13 are drilled in the main, tapped and plugged, sufficient space being left between the adjacent apertures 11 and 12 to enable a portion of the main to be removed. The plugs are removed from the apertures and inflatable sealing bags 14a and 14b are inserted through the apertures 10 and 11 and bags 15a and 15b are inserted through apertures 12 and 13. These bags are then inflated to obstruct the flow of gas through the main. Gas is still supplied by way of the by-pass 5 to the section 2 of the main now isolated from the rest 16 of the live main.

Referring to FIG. 3, with the bags 14a, 14b, 15a and 15b still in place, a portion of the main between the apertures 11 and 12 is removed by cutting with a main cutter to leave the section 2 permanently isolated from the live rest of the main 16. The end of the rest of the main adjacent to the isolated section 2 is capped off with a cap 17 and screw-in plug 18 and the bags 14a and 14b are deflated and removed and the apertures 10 and 11 left are then plugged. To the free end of the isolated section 2 is fitted an insertion duct 19 which forms a temporary seal at the end of the isolated section 2. Bags 15a and 15b are then deflated and removed and aperture 12 is plugged and a pressure gauge fitted to 13.

Referring to FIG. 16, the insertion duct 19 comprises three cylindrical concentric portions 20, 21 and 22 and a gate valve 23 adjoining the end of the cylindrical portion 22.

The first cylindrical portion 20 defines an end for the entry of the replacement main into the duct. One end of the portion 20 is provided with a radially inwardly directed flange 24 abutting which is an annular rubber gasket 25. The gasket 25 is secured to the flange 24 by bolts (not shown) which extend through the gasket 25 and the flange 24 by way of an annular end plate 26 fitting flush with the gasket 25. The wall of the portion 20 is provided with two diametrically opposed and radially outwardly extending inlet pipes 27 and 28 for enabling a lubricant, such as grease, to be supplied to the internal bore of the portion 20. The pipes 27 and 28 are threaded internally for connection to the externally threaded nozzle or nipple of a grease gun (not shown). In use, one pipe is always uppermost and connected to the grease gun and the other is plugged to prevent excess grease from ecaping. Roughly intermediate its length, the portion 20 is formed with a radially inwardly directed flange 29 which lies immediately adjacent an internally threaded section 30 of the portion 20, this section 30 extending to the other end of the portion 20. Abutting the flange 29, in use, is another rubber gasket or seal 31. This gasket 31 has an outwardly sloping circumferential face 32 which is abutted by another cylindrical portion 21.

The portion 21 is partly externally screw threaded inwardly from one end and, on being screwed into the threaded section 30 of the portion 20, engages with the face 32 to cause the gasket 31 to be forcibly urged against the flange 29 and to be retained between the flange 29 and the portion 21. Extending radially outwardly from the external wall of the portion 20 are a pair of diametrically opposed handles 33 to enable the portion 20 to be rotated into screw engagement with the portion 21.

The portion 21 is located within one end of the portion 22 and is welded thereto. Portion 22 is provided at its other end with a plate 34 which is welded to the portion 22 and forms a radially outwardly directed flange. The portion 22 is also provided with an internally threaded pipe 35 extending radially outwardly from its external wall to enable a pressure test to be taken and in the event of any failure of parts prior to 22, to flood annular space 22 with sealing grease. The pipe 35 is, in use, plugged with a threaded plug (not shown). While not shown, the portion 22 may be provided with two plates extending radially outwardly from its outer surface (in the plane of the paper), the plates being apertured to receive anchoring stakes driven through the apertures into the ground so as to anchor the duct 19 in position.

The valve 23 is a conventional damper plate valve assembly comprising two identical central gate holder sections 36 and 37 which are bolted together to form a central recess between their adjoining faces 38 and 39 to receive a movable metal gate 40. The gate 40 can be slotted into the recess to shut off gas flow through the valve 23. The gate 40 is shown in its closed position where it is held between the sections 36 and 37.

The gate 40 has a grip portion (not shown) running along its upper edge. The grip portion fits within a slot located between two ridges 41 and 42 formed on the adjoining uppermost edge of the sections 36 and 37. Two hinged bolts 43 (only one shown) are located at either end of and between the ridges 41 and 42 and can be moved to enable the gate 40 to be placed within the recess between the adjoining faces 38 and 39 of the sections 36 and 37 respectively. The bolts 43 are then raised to the upright position shown in FIG. 16 and a clamping block 44 is then placed over the bolts 43 by way of suitable apertures in the block 44. The bolts 43 are sufficiently long to enable their ends which are threaded to project above the upper surface of the block 44. Washers 45 (only one shown) are then fitted over the bolts 43 and nuts 46 (only one shown) are threaded on the bolts 43 and tightened to cause the block 44 to abut tightly against the upper surface of the ridges 41 and 42. Removal of the gate 40 is the reverse procedure of the above.

The valve 23 is bolted to plate 34 by way of an annular plate 47 which abuts the plate 34, an annular rubber gasket 48 which is located between the plate 47 and the section 36, a further annular rubber gasket 49 which abuts the section 37 and a flanged plate 50 which abuts the gasket 49. The bolts (not shown) extend through the plates 34 and 37 and 50, the gaskets 48 and 49 and the sections 36 and 37 by way of suitable apertures in these members.

The valve 23 itself is coupled to the end of the conventional coupling assembly 51 such as the Viking Johnson coupling. This is so well known to those skilled in the art that description thereof is deemed to be superfluous.

The gaskets 25, 31, 48 and 49 are so dimensioned that, in use,, the external wall of the replacement main 52 engages tightly with their internal peripheries as the main 52 passes through the duct 19. Gasket 53 in the coupling assembly 51 forms a tight fit with the isolated main 2.

Thus when gate 40 is opened to allow gas to flow into the duct 19 from the isolated section 2, the gasket 31 forms a barrier to gas flow between the internal wall of the duct portion 21 and the external wall of the replacement main 52, when as shown in FIG. 16, this is engaging the gasket 31. The gaskets 25 and 31 also form, with the duct portion 20, an annular grease chamber 54, when engaged with the replacement main 52. Also, when the gate 40 is open and the replacement main 52 is in the position shown in FIG. 16, that is, with its apertured head 55 connected to its near end 56 extending into the duct portion 22, and the wall of the main engaging the gasket 31, gas flowing from the isolated section 2 is caused to enter the head 55 and flow along the replacement main 52 and towards a purge valve assembly 57. The puge valve assembly 57, which is of conventional design, is connected to the far end 58 of the replacement main 52 by way of a connecting device 59 which along with the apertured head 55 will be described in detail later.

The purge valve assembly 57 is fitted with a conventional flame trap device 60a as a safety precaution. The purge valve tap 60b is turned to its open position to allow trapped air to issue from the end 58. After gas has been allowed to flow along the main 52 and out through the flame trap 60a for a period sufficiently long enough to ensure that the main 52 has been purged, the tap 60b is turned to its closed position sealing the gas contained in pipe 52.

Referring to FIG. 4, after the duct 19 has been fitted to the end of the isolated section 2 of the existing main 1, the apertured head 55 is fitted to one end 56 of the replacement main 52 and the purge valve assembly 57 is fitted to the other end 58 of the main 52.

The leading end of the replacement main 52 is then pushed into the duct 19, through the grease chamber 54 until the head 55 is located within the portion 22 of the duct 19 while gate 40 in the gate valve 23 is maintained in its closed position.

The replacement main 52 is of relatively smaller diameter than the existing cast iron main 1, is of a flexible plastic, such as polyethylene, and normally is supplied in the form of a coiled pipe 62. The pipe 62 could be of welded sections of straight pipe in sizes exceeding 75 mm dia.

After the head 55 has been pushed into the portion 22 of the duct 19, the gate 40 is then lifted or removed to enable gas to flow from the isolated section 2 to the head 55. The pipe 52 is then purged in the manner previously described with reference to FIG. 16.

Referring to FIG. 5, after the pipe 52 has been purged, the purge valve assembly 57 is closed, and the pipe 52 is pushed along the isolated section 2 of the cast iron main until the head 55 is located beyong the last service line 3d that is, the line nearest to the end 4 of the section 2. The line 3d is of course also the most distant line from the near end of the isolated section 2.

It is important to ensure that the head 55 is located beyond the last service line 3d. In order to do this the distance between the line 3d and the capped end 17 of the rest of the cast iron main 16 is accurately measured before the pipe 52 is inserted into the isolated section 2.

While the pipe 52 is being pushed into and along the section 2 grease is intermittently pumped into the grease chamber 54 of the duct 19 to ensure that the external wall of the pipe 52 is well lubricated so that the pipe 52 can be pushed relatively easily through the gaskets 31, 48 and 49 in the duct 19. The external wall of the pipe 52 is also preferably water lubricated before it is caused to enter the duct 19.

During the insertion of the pipe 52 into the isolated section 2 of the cast iron main 1 and indeed after the insertion has been completed as shown in FIG. 5, gas can flow into the pipe 52 by way of the head 55 although gas is prevented from leaving the pipe 52 because the purge valve assembly 57 is closed.

Referring to FIG. 6, after the insertion has been completed, the plug is removed from the aperture 12 and an expandable foam plastics material, for example, polyurethane foam, is injected through the aperture 12 and into the main section 2 and allowed to expand and set. The foam forms an annular seal 63 between the internal wall of the isolated main section 2 and the external wall of the pipe 52 and thus prevents gas flow towards the duct 19. After the foam has set the plug may be repositioned in aperture 12.

Referring to FIG. 7, after the seal 63 has been formed, the duct 19 is uncoupled from the end 64 of the isolated section 2 of the cast iron main and is slid along the pipe 52 until the duct 19 is some distance away from the end 64 of the isolated section 2. The pipe 52 is then squeezed flat at a position between the end 64 of the isolated section 2 and the duct 19 using a squeezer clamp 65 shown schematically in FIG. 7. The squeezer clamp 65 therefore imposes in the pipe 52 a temporary obstruction to the flow of gas along the pipe 52. The pipe 52 is then severed at a point 66 beyond the duct 19 to leave sufficient pipe 52 to enable it to be coupled to the end 17 of the rest of the cast iron main 16.

Referring to FIG. 8, the duct 19, with the pipe 52 still squeezed by the squeezer clamp 65, is then removed from the end 66 of the pipe 52 by sliding it along the pipe 52. An annular rubber seal 67 is then located at the end 64 of the isolated section 2 so as to form a permanent annular seal between the pipe 52 and the isolated cast iron main section 2. A typical seal is the Raychem plug seal.

The plug is then removed from the aperture 10 in the rest of the cast iron main 16 and bag 14a is then reinserted into the main 16 by way of the aperture 10 and inflated to prevent gas flow towards the capped end 17 of the main 16. For additional security, a bag 14b is also re-inserted into the main 16 by way of the aperture 11 from which the plug has been removed, and the bag 14b is inflated.

Referring to FIG. 9, the plug 18 is removed from the capped end 17 of the main 16 and the end 66 of the pipe 52 coupled to the main 16 by means of a conventional coupling assembly 69 shown schematically in FIG. 9.

Referring to FIG. 10, the bags 14a and 14b are then deflated and removed from the main 16. The apertures 10 and 11 are then plugged. The squeezer is then removed to allow gas to flow into pipe. The by-pass valve 8 is closed and the pressure gauge 61 is checked to ensure pipe 52 is supplying sufficient pressure to pipe 2. The by-pass 5 is then removed and the apertures 6 and 7 are plugged. Finally the pressure gauge 61 is removed and its aperture 61 is also plugged. At this stage therefore the isolated section 2 of the cast iron main is maintained live by gas flow from the live main 16 solely by way of the pipe 52 since the gas flows out through the head 55 and into the space between the external wall of the pipe 52 and the internal wall of the isolated section 2 of the cast iron main. Gas users therefore continue to receive gas via their service lines 3a–d but without the necessity to retain a by-pass until the user service lines are all connected up to the replacement pipe 52. Thus the excavation can now be filled in.

The user service lines can be disconnected from the isolated section 2 of the cast iron main and reconnected to the pipe 52 either immediately or if, more convenient, at some future date.

In order to complete the process of replacement, it is necessary to disconnect the existing service lines from the isolated section of the cast iron main and reconnect them to the replacement pipe main. It is also necessary to remove the head 55 from the pipe 52 so that the head 55 can be used again and to seal off the head end of the pipe 52 after removing the head 55. It has been found most convenient to remove the head 55 and seal the head end of the pipe 52 after all but the last two service lines 3c and 3d have been connected to the replacement main 52.

Referring to FIG. 11, it should be understood that at this stage all the existing service lines except 3c and 3d have been disconnected from the isolated section 2 and reconnected to the pipe 52. The method of performing their disconnection and reconnection will become clear from the description which follows.

The penultimate service line 3c is disconnected from pipe 2 and plugged. The plug is then removed to provide aperture 70 and an expandable polyurethane foam is injected through aperture 70 in a forward position towards 3d in section 2. The foam is allowed to expand and set to form an annular seal 71 acting as a barrier to gas flow in the space between the section 2 and the pipe 52 in the direction away from the end 4 of the section 2. After the seal 71 has formed, the aperture 70 is re-plugged.

Figure 13:
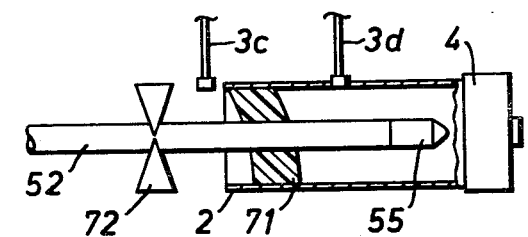

Referring to FIG. 13, a section of the main 2 is then broken away from the main 2 and expose the pipe 52. The pipe 52 is then squeezed flat by a squeezer clamp 72 at a position upstream of the service line 3c. Gas flow along the pipe 52 towards the head 55 is thereby temporarily obstructed.

Figure 14:
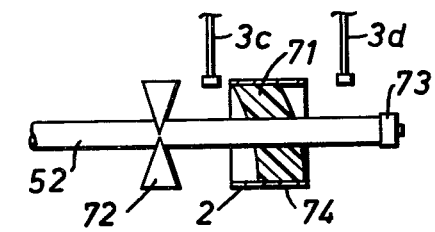

Referring to FIG. 14, the end section of the main 2 is then broken away to disconnect the service line 3d from the main 2 and to expose the head end of the pipe 52. The head 55 is then removed from the end of the pipe 52 and the end is capped with a conventional plugged cap 73 so as to seal the end of the pipe 52.

Figure 15:
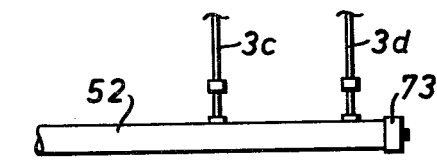

Referring to FIG. 15, the service lines 3c and 3d are then connected up to the pipe 52 in the conventional manner and finally the squeezer clamp is removed.

It will be appreciated that the other service line can be transferred from pipe 2 to the inserted pipe 52 in a similar manner as described in 3c except that pipe 52 is not squeezed off. In other words a seal like seal 71 is first formed between two service lines. This keeps the annular space between 2 and 52 live in the section between the seal and the head 55 together with the services connected to pipe 2 in that section. Beyond this seal in the opposite direction the gas flow in the annular space ceases rendering the section of pipe 2 and all services connected to it dead.

The service line is then disconnected from main 2, a section of this main is then broken out to expose pipe 52 to which the service is then connected.

Service lines can therefore be disconnected and reconnected sequentially working along the main 2 from its entry and to the far end 4. User inconvenience is therefore reduced to a minimum since only that user whose service line is being replaced will be disconnected from the gas supply and then only for a very short time. Those users upstream or downstream of that service line will either still be connected to the old main or will have been reconnected to the new main.

Referring to FIGS. 17 and 18, the head 55 comprises a nozzle 75, a cylindrical end portion 76 for connection to the leading end 77 of the pipe 52 and a curved nose 78 at the other end of the head 55.

The cylindrical end 76 of the head 55 is provided with an annular flange 79 near to its nozzle end.

The flange 79 forms an abutment for the leading end 77 of the pipe 52 which is fitted over a rear part 80 of the portion 76. The portion 76 is provided in its rear part 80 with two diametrically opposed threaded apertures which serve to retain two grub screws 81 and 82 which extend through corresponding apertures in the pipe wall to hold the pipe 52 on the portion 76. A front part 83 of the portion 76 is externally threaded for engagement with an internally threaded ring 84 as shown in FIG. 18.

The nose 78 has a annular recess 85 formed rearwardly to receive the forward ends of a number of circumferentially spaced axially extending bars 86. These bars 86 serve as means for spacing the nozzle 75 from the internal wall of the cast iron main as the head 55 is pushed therealong and after the head 55 has come to rest.

The bars 86 are welded to the nose 78 at their forward ends and to the ring 84 at their rearward ends.

The nozzle 75 itself comprises three concentric cylinders 87, 88 and 89 located within the cage formed by the bars 86 as shown in FIG. 17.

The outermost and innermost cylinders 87 and 89 comprise identical perforated metal cylinders while the middle cylinder 88 comprises a loose replaceable metal gauze acting as a filter for undesired dirt and the like. The apertures in the outer and inner cylinders 87 and 89 are very much larger than those in the gauze 88.

The outer cylinder 87 is welded at one end to the ring 84 and at the other end to the nose 78 as shown in FIG. 18. The inner cylinder 89 is welded at one end to the portion 76.

The cylinders are chosen so that the total area of their apertures is four times the area of the pipe bore. This ensures that there will always be a certain number of apertures available to enable gas to flow into and out of the head even if some apertures become blocked by dirt and the like during the insertion of the pipe.

The nose 78 is curved so as to be able to ride over any obstructions present in the old main during insertion. Its weight is also much greater than that of the rest of the head 55 for a similar reason.

After use, the head 55 can be removed from the pipe 52 simply by removing the grub screws 81 and 82 and pulling the head 55 off from the leading end 80 of the pipe 52. The head 55 can then be disassembled for cleaning by unscrewing the end portion 76 and removing therewith the inner cylinder 89 and the loose gauze 88. Reassembly is the reverse procedure to the above.

Referring to FIG. 19, the connecting device comprises a cylindrical body 90 having a central axial bore 91, a first portion 92 for fitting into the trailing end 93 of the replacement pipe main 52 and a second portion 94 for connection to the inlet pipe 95 of a conventional purge valve (not shown).

The first portion 92 includes a relatively reduced diameter section 96 extending from the second portion 94 so that a shoulder 97 is formed between the portions 94 and 96. The shoulder 97 acts as an abutment against which the end 93 of the pipe 52 abuts, the pipe 52 being otherwise force fitted over the first portion 92.

The first portion 92 also includes two rubber seals 97 and 98 in the form of rings and two metal, for example steel, rings 99 and 100. The seals 97 and 98, the rings 99 and 100 and the section 96 all have identical external diameters.

Seal 97 is located between the section 96 and the ring 99 and seal 98 is located between the rings 99 and 100, the latter forming an end section to the first portion 92.

The second portion 94 is of metal, for example steel, and has its bore partly threaded inwardly from its end so that it can be connected to an externally threaded portion 101 of the purge valve inlet 95.

Extending axially through the body 90 on either side of the central body 91 are two diametrically opposed smaller bores 102 and 103. These bores 102 and 103 receive the stems of two bolts 104 and 105 as shown in FIG. 19. The ends of the stems are threaded and partly extend beyond the end of the second portion 94. Nuts 106 and 107 are threaded onto the bolt stems and on being tightened down onto the end of the second portion 94 cause the portions 92 and 94 to be urged together. The rubber seals 97 and 98 are thus caused to deform radially outwardly (and indeed inwardly) so as to form a seal with the internal wall of the pipe 52. When the purge valve is connected to the second portion 94, gas can flow from the pipe 52 to the valve by way of the bore 91 in the device.

As previously mentioned, one of the main advantages of the live insertion technique described is that after the isolated section of the old main has been replaced by the pipe, the section of the old main can be maintained live without the use of a by-pass until service lines are reconnected to the new main. This contrasts with the prior art methods of live insertion where it was absolutely essential to retain the by-pass until existing service lines were connected in the new main.

Another big advantage of the live insertion technique described in that only the excavation needs to be made to enable the new main to be inserted into the old main. In contrast, with the prior art methods of live insertion it is necessary to make two excavations, one at either end of the isolated section of the old main, in order to carry out the insertion.

While when replacing a "dead end" main it is necessary with the present technique to use a temporary by-pass, the by-pass can be dismantled immediately the new main has been connected up to the live section of the old main.

While the present technique has been described with reference to the replacement of a "dead end" main, it will be appreicated that the technique is equally applicable to the replacement of a so-called "back-fed" main, that is, one which while isolated from one part of the live main is still joined to another part of the live main. In this case of course it will not be necessary to use even a temporary by-pass as the isolated main will be kept live However, the prior art methods still need to retain a by-pass even when they are used to replace a "back-fed" main and the by-pass cannot be dismantled until the existing service lines are all connected to the new main.

We claim:

1. In a method for replacing a section of an existing fluid transportation main without disrupting fluid flow to individual service lines connected to the section until such time as an individual service line is to be disconnected from the section and re-connected to a replacement main, the steps of:
   initially removing a portion of the existing main adjacent one end of the section to be replaced to thereby present a free end on the section;
   maintaining fluid flow between the existing main and the section to be replaced by means of a bypass line during the removal of said portion;
   inserting a length of a smaller replacement main into the section to be replaced through the free end of the latter, the internal end of the replacement main being open to flow of fluid whereby the section to be replaced and the inserted replacement main are in fluid communication;
   interconnecting the replacement main and the existing main for fluid flow; and thereafter
   removing said bypass line and allowing fluid to flow from the existing main and into the section to be replaced solely through said internal end of the replacement main whereby individual service lines may subsequently be isolated and connected directly to the replacement main without disrupting fluid flow to other service lines.

2. The invention of claim 1 wherein fluid is caused to enter the length of replacement main before the length is fully inserted into the section to be replaced and said length is purged before said interconnecting of the same and the existing main.

3. The invention of claim 2 wherein before said length of replacement main is fully inserted, the same is purged through purge valve means located at a position remote from said internal end.

4. The invention of claim 3 wherein before interconnecting the replacement main and the existing main, the flow of fluid along the replacement main is temporarily obstructed at a point located upstream from the purge valve means and externally of the section and the purge valve means is removed from the replacement main, and after interconnecting the replacement main and the existing main, the temporary obstruction is removed.

5. The invention of claim 2 wherein during said purging the fluid enters the length of replacement main through said internal end thereof.

6. The invention of claim 2 wherein the free end of the section to be replaced is provided with a temporary replacement main receiving seal, the replacement main being inserted through said seal, said seal being removed before interconnection of the replacement main and the existing main.

7. The invention of claim 6 wherein the annular space between the external wall of the replacement main and the internal wall of the section to be replaced is sealed at a point proximal said free end of the section and only thereafter is said temporary seal removed.

8. The invention of claim 7 wherein said length is inserted sufficiently far into the section to be replaced to locate the internal end thereof beyond the service line which is most remote from said free end of the section.

9. The invention of claim 8 wherein said internal end of the replacement main is sealed after all but the two service lines most remote from said free end have been connected directly to the replacement main.

* * * * *